United States Patent
Okada

[19]

[11] Patent Number: 5,915,159
[45] Date of Patent: Jun. 22, 1999

[54] AUTOMATIC ORIGINAL FEEDING DEVICE WITH JAM RECOVERY DISPLAYS

[75] Inventor: Tamotsu Okada, Kawasaki, Japan

[73] Assignee: Canon Kabushiki Kaisha, Tokyo, Japan

[21] Appl. No.: 08/631,124

[22] Filed: Apr. 12, 1996

[30] Foreign Application Priority Data

Apr. 18, 1995 [JP] Japan .................................. 7-092618

[51] Int. Cl.⁶ .................................................. G03G 15/00
[52] U.S. Cl. ...................... 399/371; 271/258.04; 399/374
[58] Field of Search .................... 355/316, 318, 355/320, 205–206; 271/3.15, 3.17, 4.02, 4.03, 258.01, 258.03, 258.04, 259, 3.03

[56] References Cited

U.S. PATENT DOCUMENTS 4,579,326   4/1986   Pinckney et al. ................. 271/3.03
4,786,041  11/1988   Acquaviva et al. ............... 271/3.13
4,996,557   2/1991   Takagi ............................. 355/50
5,502,556   3/1996   Yamada ........................... 355/320

*Primary Examiner*—Joan H. Pendegrass
*Assistant Examiner*—Quana Grainger
*Attorney, Agent, or Firm*—Fitzpatrick, Cella, Harper & Scinto

[57] ABSTRACT

An automatic original feeding device has a mounting unit for mounting originals, a first sheet conveying path for conveying an original mounted on the mounting unit to a predetermined position, and a second sheet conveying path for guiding the original output from the predetermined position to a discharging unit. The device can be opened to expose the first and second sheet conveying paths. The device also includes display units, each provided in the vicinity of the corresponding one of the first and second sheet conveying paths, for displaying information about originals remaining in the first and second sheet conveying paths.

50 Claims, 10 Drawing Sheets

AUTOMATIC ORIGINAL FEEDING DEVICE WITH JAM RECOVERY DISPLAYS

BACKGROUND OF THE INVENTION

1. Field of the Invention

This invention relates to an automatic original feeding device, and more particularly, to an automatic original feeding device provided in an image reading apparatus, such as a scanner or the like, or in an image forming apparatus, such as a copier, a laser-beam printer or the like.

The invention also relates to an automatic original reading device, such as a scanner or the like, which includes an automatic original feeding device, and to an image forming apparatus, such as a copier, a printer or the like, which includes such an automatic original reading device.

2. Description of the Related Art

In automatic original feeding devices provided in image forming apparatuses/image reading devices (hereinafter termed "apparatuses"), such as copiers, scanners or the like, originals mounted on an original-mounting unit are sequentially fed to an original-reading position of the apparatus which sequentially reads the images of the fed originals, and the read originals are sequentially discharged to a discharging unit.

When images are to be read from both surfaces of an original, the second surface of the original is read by automatically inverting the original within the automatic original feeding device, and refeeding the original to the reading position.

In some apparatuses, a manual path is provided separately from a path for automatic original feeding in order to deal with an interrupt while an original is fed or an original in an inferior state (a folded original, a creased original, a bonded original or the like), and the image of the manually inserted original is read.

When an automatic original reading device or an image forming apparatus has various kinds of original-image reading modes as described above, it is naturally difficult to use a common original-feeding path for all of the modes. Accordingly, when the apparatus stops due to a jam or the like of an original, originals remain in original-feeding paths corresponding to the respective modes.

As described above, originals may remain in various states in which, for example, the surfaces of some of the originals have been inverted, other original have been read, and other originals have not been read yet. In automatic original feeding devices for high speed reading in recent apparatuses, the interval between adjacent originals is mininized in order to shorten an image reading operation and to minimize loss time between reading operations. Accordingly, a plurality of originals are fed in conveying paths within the main body of the apparatus.

Accordingly, a plurality of originals may remain in conveying paths when the apparatus stops, for example, due to a jam of an original, and the originals may remain in the above-described various states (in which, for example, the surfaces of some originals have been inverted, other originals have been read, and other originals have not been read yet).

When a plurality of originals remain in the conveying path, the order of the remaining originals may not be clear to the user who performs jam recovery processing unless a simple substantially straight path is used. Particularly when the apparatus is operated by a dedicated operator (not the author of the originals), it is not uncommon for the operator to be unable to know the order of the originals.

Although some of conventional apparatuses display, for example, the order of jam removing operations for originals, or the positions of remaining originals on a liquid-crystal panel or the like, they do not have means for displaying when the user performs jam removing operations according to his unique approach, or for displaying processing for removed originals.

However, when actually performing jam removing operations in an automatic original feeding device, it is impossible to return removed originals to initial states unless, for example, the surface of each of the originals to be read and the order of the originals to be read is clear.

Even if the surface of each of the originals to be read and the order of the originals to be read are displayed on an operation panel, the user, who performs jam removing processing, will find it very difficult to know information relating to the states of the originals in the initial states unless displays relating to the states of the originals are present in the vicinity of the corresponding original-conveying paths (processing-state information).

Furthermore, when an original-feeding unit is provided separately from a discharging unit, it is necessary to return read originals to the discharging unit, and to return unread originals to the original-feeding unit. However, these operations cannot be peformed without error unless the states of reading operations are clear.

That is, since means for showing the condition of the originals remaining in the original-feeding paths (the surface of each of the originals to be read, the order of the originals to be read, read originals, and unread originals) to the operator are absent, it is difficult to appropriately process the remaining originals to recover the reading operations.

SUMMARY OF THE INVENTION

The present invention has been made in consideration of the above-described problems.

It is an object of the present invention to provide an automatic original feeding device which can clearly notify the user of the state of currently performed processing in order for the user to return remaining originals to initial states when an original is jammed in an original-feeding path within the main body of the device.

According to one aspect, the present invention relates to an automatic original feeding device comprising mounting means for mounting originals, a first sheet conveying path for conveying an original mounted on the mounting means to a predetermined position, and a second sheet feeding path for guiding the original from the predetermined position to discharging means. The apparatus is openable to expose the first and second sheet conveying paths. The device also comprises a plurality of display means, each provided in the vicinity of the corresponding one of the first and second sheet conveying paths, for displaying information about originals remaining in the first and second sheet conveying paths.

According to still another aspect, the present invention relates to an automatic original feeding device comprising mounting means for mounting originals, a first sheet conveying path for conveying an original mounted on the mounting means to a predetermined position, an inverting conveying path for guiding the original discharged from the predetermined position along a path back to the predetermined position by inverting surfaces of the original, and a second sheet feeding path for guiding the original from the predetermined position to discharging means. The device is openable to expose the first and second sheet conveying paths and the inverting conveying path. The device also comprises a plurality of display means, each provided in the vicinity of the corresponding one of the conveying paths, each for displaying information relating to originals remaining in the corresponding one of the conveying paths.

According to still another aspect, the present invention relates to an automatic original feeding device in which originals are read at a predetermined position, and a plurality of conveying paths for guiding the original to the predetermined position and to guide the original discharged from the predetermined position to discharging means. Some of the plurality of conveying paths are openable. The device comprises a plurality of display means, each provided in the vicinity of the corresponding one of some of the opened conveying paths, for displaying information relating to originals remaining within the opened conveying paths.

According to the above-described configurations, when the operation of the entire device stops due to a jam of a fed original within a sheet feeding path, the states of remaining originals are displayed on the plurality of display means. It is thereby possible to clearly notify the user of the states of the remaining orignals, to prevent a misoperation when the user returns the jammed original to an initial state, and to efficiently perform jam removing processing.

By arranging the device so that the contents of display of information relating to remaining originals can be switched between different information by switching means and the switching of the display is controlled in accordance with the state, it is possible to display the states of originals corresponding to respective modes even if the originals are within the same conveying path, and to perform display corresponding to a larger number of automatic original feeding devices.

By providing display means for clearly displaying information relating to remaining originals in the vicinity of each sheet feeding path or in a sheet feeding path outside a sheet feeding region, the user can easily know the state of the originals in a series of jam removing operations when removing the remaining originals in jam removing processing or the like. Accordingly, it is possible to perform efficient jam removing operations which produce smaller errors.

As described above, according to the present invention, in an automatic original feeding device having a complicated sheet feeding path or a plurality of sheet feeding paths corresponding to various kinds of original-processing modes, such as a single-side reading mode, a processing mode and the like, it is possible to suppress a misoperation relating to the surface of an original to be read and the order of originals to be read when returning originals remaining in sheet feeding paths to initial states, and to improve the recovering property to the initial states before the occurrence of a jam.

By providing display means for displaying information relating remaining originals in the vicinity of each sheet feeding path instead of providing it at a separate location, such as a panel on the main body of the device, or the like, obstacles in jam removing operations disappear, and therefore operability of jam removing processing is improved.

As a result, it is possible to realize an automatic original feeding device in which even if a plurality of originals remain in sheet feeding paths of the device, the remaining originals can be returned to initial states.

DESCRIPTION OF THE PREFERRED EMBODIMENTS

Preferred embodiments of the present invention will now be desribed with reference to the drawings.

First Embodiment

Figure 1:
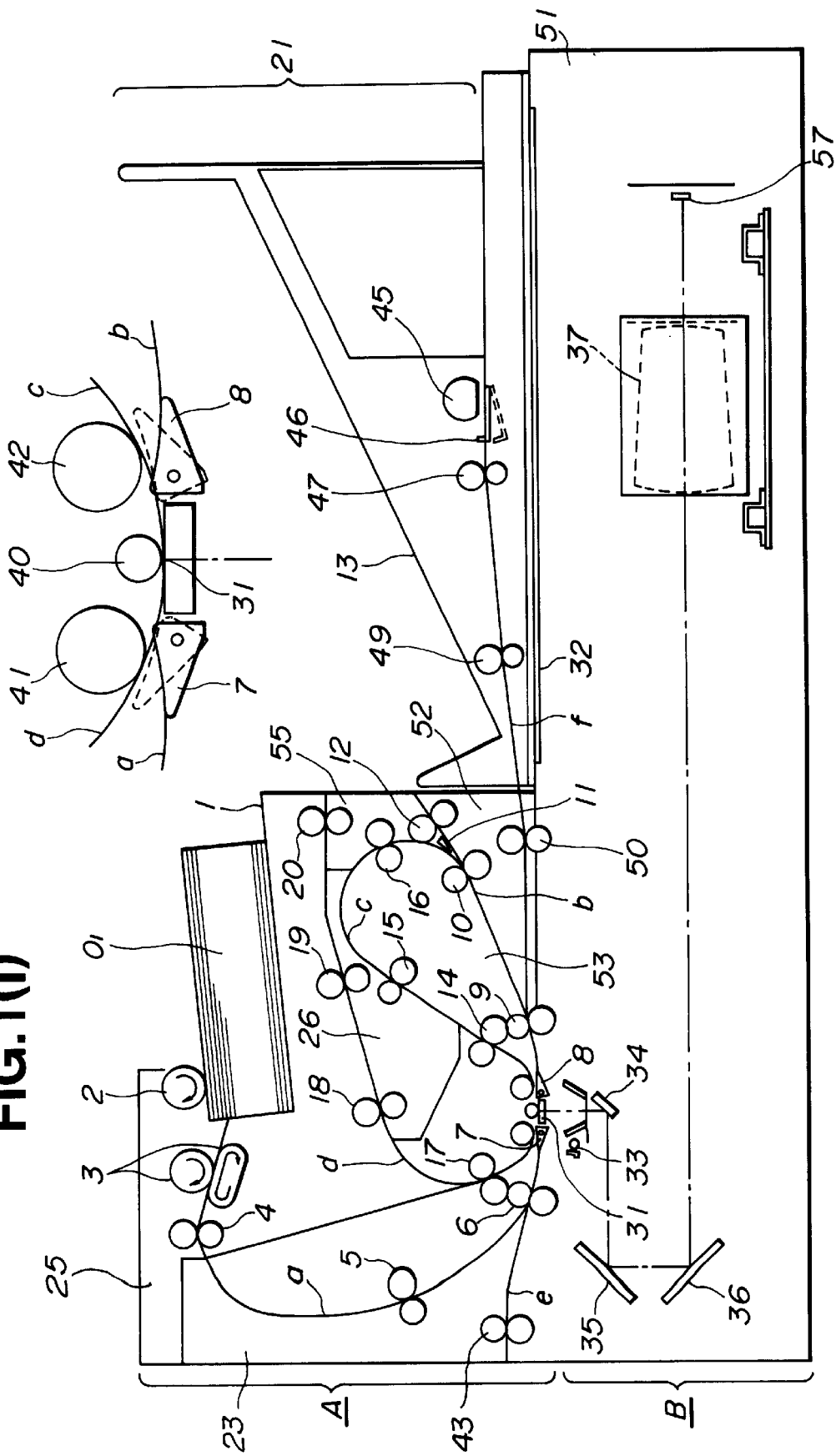
FIGS. 1(*i*) and 1(*ii*) are vertical cross-sectional side views illustrating an automatic original feeding device and an automatic original reading device including such a device according to a first embodiment of the present invention.

FIG. 1(*i*) is a schematic diagram illustrating the configuration of an automatic original feeding device according to a first embodiment of the present invention.

In FIG. 1(*i*), symbol A represents an automatic original feeding device, and symbol B represents an image reading device. By combining the devices A and B, image information of a read original is input to a printer, a computer or the like via cables or the like.

Figure 3:
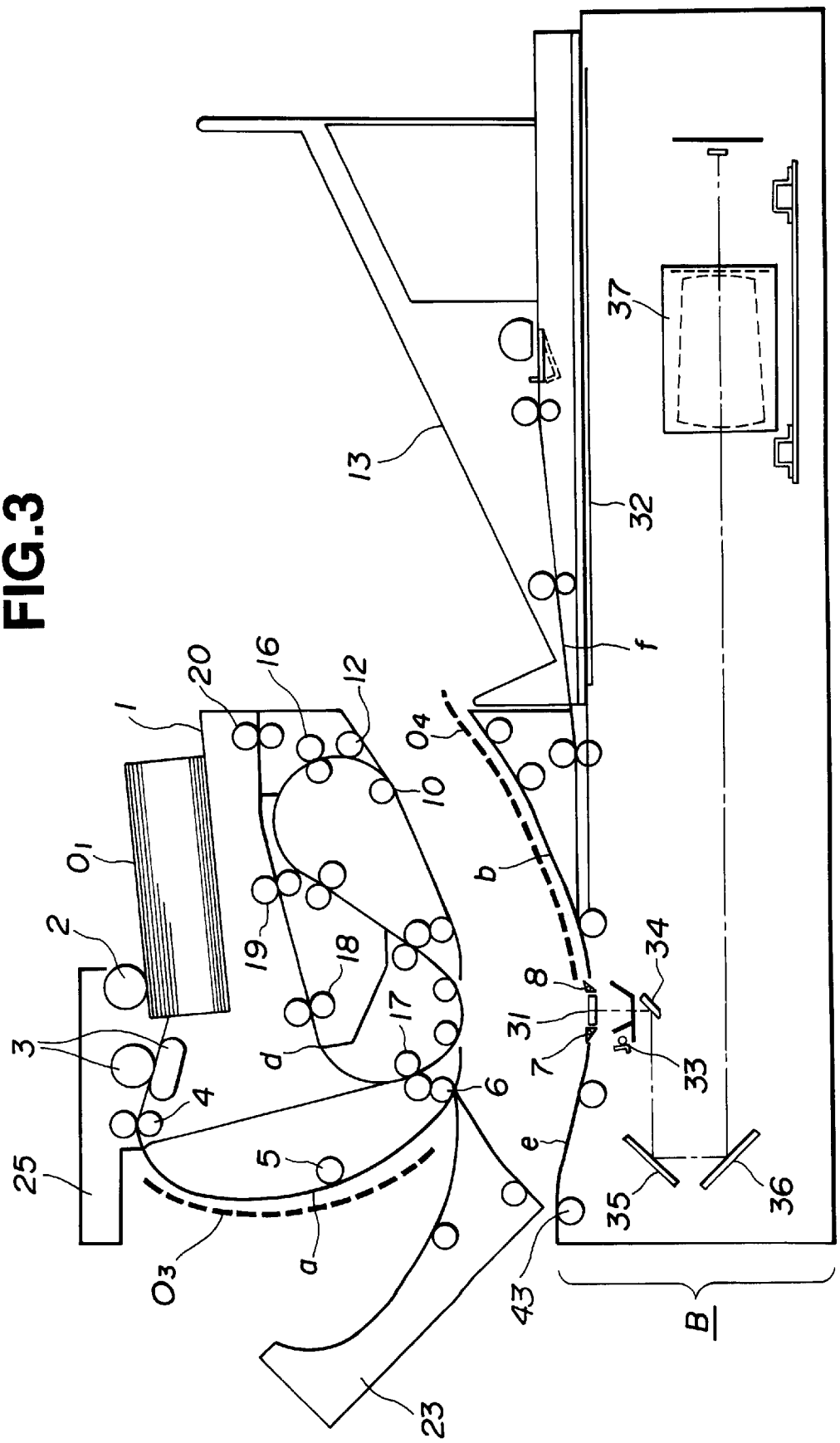
FIG. 3 is a cross-sectional side view of the automatic original feeding device shown in FIG. 1(*i*) in a first divided state.

The automatic original feeding device A is mounted on the upper surface of a main body 51 of the device B so as to be openable/closable relative to the upper surface. In general, the device A is rotatably openable/closable between a state shown in FIG. 1(*i*) in which the device A is turned down and closed on the upper surface of the device B, and a state in which the device A is raised and separated from the upper surface of the device B. FIG. 3 illustrates such an opened state.

In the device B, reference numerals 31 and 32 represent two plates of platen glass, serving as first and second original reading units (original-reading positions), disposed on the upper surface of the device B. The first original reading unit 31 is used for reading a moving original, and the second original reading unit 32 is used for reading a stationary original. An original-illuminating lamp 33, first through third scanning mirrors 34, 35 and 36, respectively, and a photoelectric reading unit 37 constituting an original-reading system disposed within the device B.

In the automatic original feeding device A, an original-mounting tray (original-mount) 1 serves as an original-mounting unit. Originals $O_1$ are mounted and set on the tray 1 with the surfaces images placed facing upward. A feeding roller 2 rotates in response to an original-feeding start signal, to contact the uppermost surface of the mounted originals $O_1$ with a predetermined pressing force. Thus, a feeding force is applied to the uppermost surface of the mounted originals $O_1$ to feed the originals $O_1$ into the device A, and the uppermost original $O_1$ is separated and fed by a pair of separation feeding rollers 3, and enters a first original conveying path (feeding path) "a". Respective pairs of rollers 4, 5 and 6 are provided in the first original conveying path "a".

Next, a description will be provided of an original-reading mode.

(1) One-side reading mode (FIGS. 1(*i*) and 1(*ii*))

The original leaving the first original conveying path "a" passes a first flapper 7 (set at a position indicated by solid lines in FIG. 1(*ii*)), the upper surface of the platen of the first original reading unit 31 in close contact therewith and a second flapper 8 (set at a position indicated by solid lines in FIG. 1(*ii*)), and enters a second original conveying path b (discharging path), and is discharged onto a discharging tray 13, serving as a discharging unit, by a pair of discharging rollers 12 by being guided by a third flapper 11. Respective pairs of original-conveying rollers 9 and 10 are provided in the second original conveying path b.

The original-illuminating lamp 33, and the first through third scanning mirrors 34, 35 and 36, respectively, are held at positions below the platen of the first original reading unit 31 as shown in FIG. 1(*i*).

While the fed original passes over the upper surface of the platen of the first original reading unit 31 in close contact therewith, the lower image surface of the original is illuminated by the original-illuminating lamp 33, and light reflected by the surface of the original enters the photoelectric reading unit 37 via the first through third scanning mirrors 34, 35 and 36, respectively, so that image information of the running original is read. The read image information is stored in a storage unit 57.

By repeating the above-described operation, the originals $O_1$ mounted on the original-mounting unit 1 are sequentially separated, fed, read and discharged in the one-side reading mode.

(2) Both-side reading mode (FIGS. 1(*i*) and 1(*ii*))

In a both-side reading mode in which both surfaces of an original are read, the original guided to the platen of the first original reading unit 31 along the first original conveying path "a" enters a third original conveying path (inverting path) c according to switching of the posture of the second flapper 8 (set at a position indicated by broken lines in FIG. 1(*ii*)), and the original is inverted. Before the leading edge of the inverted original again reaches the second flapper 8, the second flapper 8 returns to the position indicated by the solid lines, and the posture of the first flapper 7 is switched to a position indicated by broken lines.

By thus being guided by the first and second flappers 7 and 8, respectively, the original is fed to the upper surface of the platen of the first original reading unit 31 in a direction opposite to the direction it is guided in the above-described case (1), and the second surface of the original is read. Respective pairs of original conveying rollers 14, 15 and 16 are provided in the third original conveying path c. After the second surface of the original has been read, the original enters a fourth original conveying path (inverse discharging path) d, is conveyed by respective pairs of original conveying rollers 17, 18 and 19, and is discharged onto the discharging tray 13 by a pair of duplex-original discharging rollers 20.

While the inverted and refed original passes through the upper surface of the platen of the first original reading unit 31 in close contact therewith, image information of the lower image surface of the original is read by the original reading system, comprising the components 33–37, of the device B.

By repeating the above-described operation, the originals $O_1$ mounted on the original-mounting unit 1 are sequentially separated, fed, read and discharged in the both-side reading mode.

Figure 2:
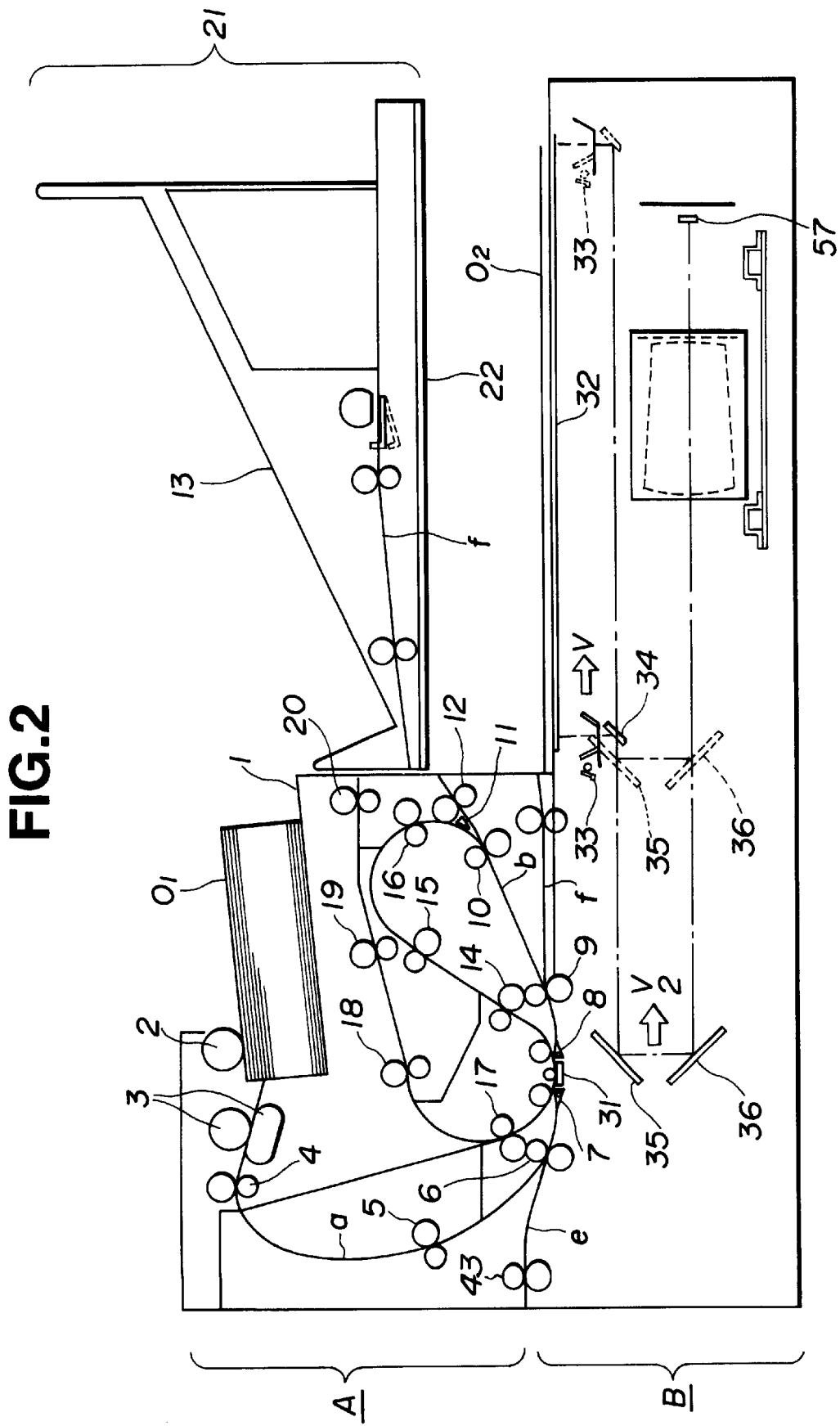
FIG. 2 is a cross-sectional side view of the automatic original feeding device and the automatic original reading device shown in FIG. 1(*i*) in a fixed-original reading mode.

(3) Fixed-original reading mode (FIG. 2)

In a fixed-original reading mode, a pressing-plate unit 21 of the automatic original feeding device A is raised and opened from the upper surface of the device B (see FIG. 2). An original $O_2$ is mouted on the upper surface of the platen of the second reading unit 32 of the device B according to predetermined mounting reference with the image surface of the original to be read placed downward, and the pressing-plate unit 21 is turned down and closed on the upper surface of the device B. Thus, the original $O_2$ is stably pressed on the upper surface of the platen of the second reading unit 32 in close contact therewith by an original-pressing plate 22.

The original-illuminating lamp 33, the first scanning mirror 34, the second scanning mirror 35 and the third scanning mirror 36 of the original-reading system of the device B are switched from the position below the first reading unit 31 shown in FIG. 1(*i*) to positions indicated by broken lines shown in FIG. 2.

Then, the original-illuminating lamp 33 together with the first scanning mirror 34, and the second scanning mirror 35 together with the third scanning mirror 36 are moved from the left to the right along the lower surface of the platen of the second reading unit 32 at predetermined speeds V and V/2, respectively, in response to a reading start signal. Accordingly, the lower image surface of the original $O_2$ set on the platen of the second reading unit 32 is sequentially scanned from the left to the right, whereby image information of the fixed original $O_2$ is read.

The automatic original feeding device A of the present embodiment includes a portion for feeding the original to the first original reading unit 31 for reading a moving original, and the pressing-plate unit 21 provided on the second reading unit 32 for reading a stationary original, each of which is openable and closable relative to the device B.

The automatic original feeding device A of the present embodiment can also deal with a mode for reading a continuous sheet-like original, such as a computer form or the like, in which the original is fed through a fifth conveying path e and then conveyed by the discharging rollers 12 and is discharged outside the device after passing through the second conveying path b, and a mode for reading a manually inserted original in which the original is guided to the first original reading unit 31 through a sixth conveying path f present below the lower surface of the discharging tray 13 and is discharged through the fifth conveying path e. In FIG. 1(*i*), there are also shown a manually-inserted-sheet feeding roller 45, a leading-edge regulating plate 46, respective pairs of conveying rollers 47, 49 and 50, and a pair of discharging rollers 43.

Figure 4:
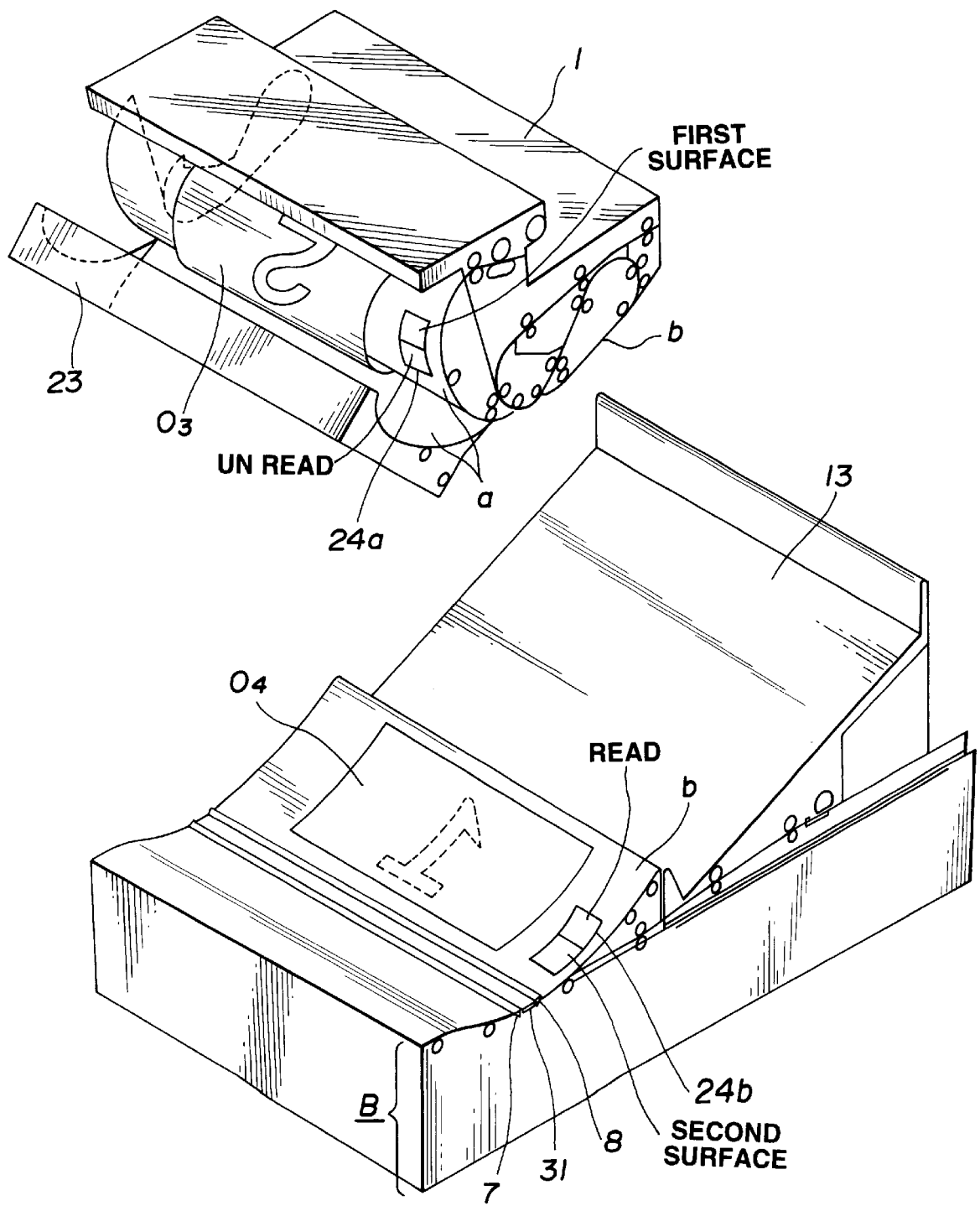
FIG. 4 is a perspective view of the automatic original feeding device shown in FIG. 1(*i*) in the first divided state.

Next, a description will be provided with reference to FIGS. 3 and 4 of a case in which abnormality, such as a jam or the like, when it occurs in the one-side reading mode in the automatic original feeding device of the present embodiment.

As shown in FIG. 3, when the automatic original feeding device A is opened from the device B around a hinge unit (not shown) provided at a rear portion of the device B, the automatic original feeding device A is divided making the second original conveying path b and the fifth conveying path e a border (a first divided state). A first-conveying-path guide 23 rotatably provided in the automatic original feeding device A is closed.

Then, the first-conveying-path guide 23 is opened by the user exposing the first original conveying path "a" a border (see FIG. 3). In FIG. 3, in order to schematically show the configuration, the automatic original feeding device A is separated from the device B in the vertical direction. In a state in which the devices stop, originals $O_3$ and $O_4$ remain within the devices. The original $O_3$ remains in a midsection of the first original conveying path "a", and the original $O_4$ remains in a midsection of the second original conveying path b.

When the operator performs jam recovery from the left side of the devices A and B in a state in which the first-conveying-path guide 23 is opened, the first surface of the original $O_3$ (the upper surface when the original $O_3$ is set on the original mounting tray 1) is exposed. Since the original $O_3$ does not pass through the first original reading unit 31 yet, the original $O_3$ is an unread original. Since the operator opens the device A and intents to process the original $O_4$ from above the device B, the second surface of the original $O_4$ is exposed. Since the original $O_4$ has passed through the first original reading unit 31, it is a read original.

However, a general user or a specific operator cannot determine the states of remaining originals and the states of processing within the devices A and B. Accordingly, as shown in the perspective view of FIG. 4, display means 24a and 24b indicating original-processing states are provided on guide plates. The display means 24a is provided for the original $O_3$ in the first original conveying path "a". Since the first surface of the original $O_3$ is not yet read, the display means 24a displays information, such as "first surface" and "unread". Since the second surface of the original $O_4$ has been read, the display means 24b displays information, such as "second surface" and "read".

Thus, the user can easily understand the states of remaining originals when removing them in jam recovery processing or the like, and removed originals can be returned to initial states without producing an error.

By providing each of the display means 24a and 24b in the vicinity of the corresponding conveying path, the user can perform a series of jam removing operations without interruption, and therefore can perform jam removing operations more efficiently than when, for example, displaying the states of remaining originals separately only on another display unit, such as an operation panel or the like. The present embodiment is also very effective for a user who is not familiar with the devices, and for a dedicated operator who deals with originals provided by other people.

As will be described later with reference to FIG. 5, units 25, 26 and 55 can also be opened.

Second Embodiment

Figure 5:
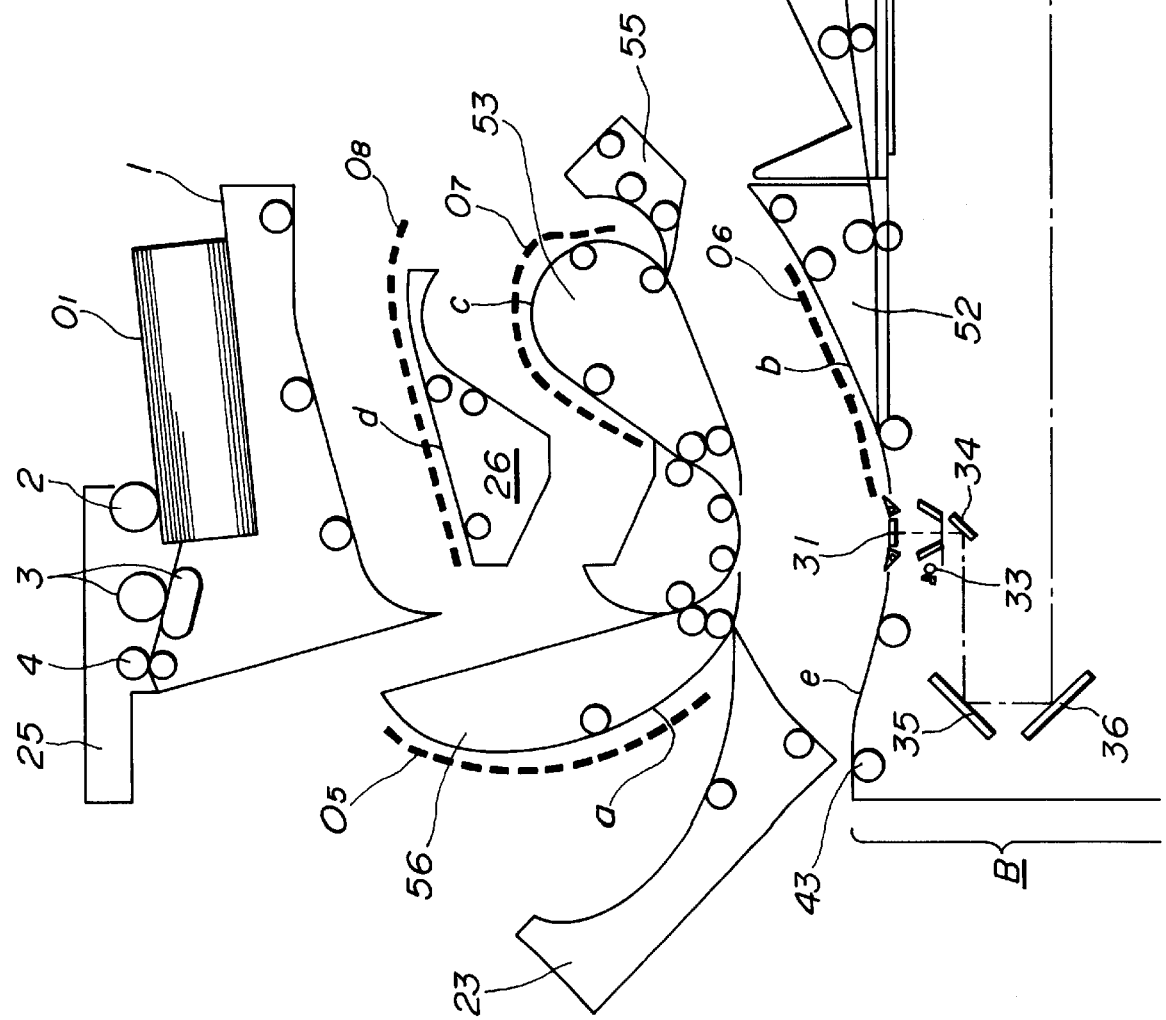
FIG. 5 is a cross-sectional side view illustrating an automatic original feeding device in a second divided state according to a second embodiment of the present invention.
Figure 6:
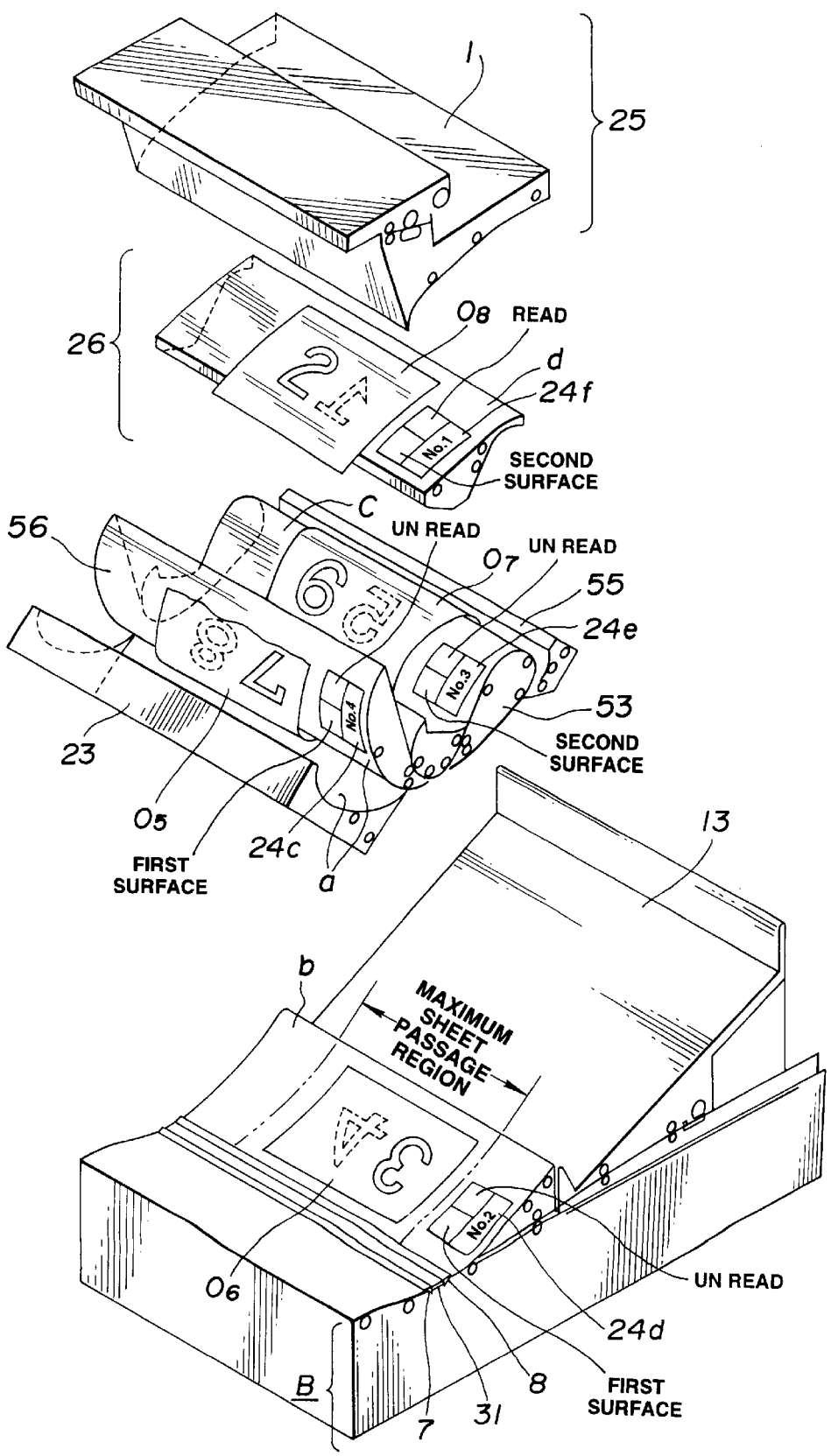
FIG. 6 is a perspective view of the automatic original feeding device shown in FIG. 5 in the second divided state.

Next, a description will be provided of jam removing processing in the both-surface reading mode with reference to FIGS. 5 and 6. This embodiment deals with a case in which display means are disposed for paths provided for both-surface processing.

As described above, the automatic original feeding device A is opened from the device B exposing the second original conveying path b and the fifth original conveying path e, and the first-conveying-path guide 23 is opened by the user exposing the first original conveying path "a" as in the case of the above-described one-surface processing. In addition, in the case of the both-surface reading mode, an original-feeding unit comprising the original-mounting tray 1 is opened exposing the fourth original conveying path d. Furthermore, it is also possible to open a duplex-original discharging unit 26 exposing the third original conveying path (inversion path) c (a second divided state). Although schematically illustrated as in the case of the one-side reading mode, the respective units of the automatic original feeding device A are, of course, openably/closably supported around a hinge unit (not shown) present at a rear portion of the device B.

Originals $O_5$, $O_6$, $O_7$ and $O_8$ remain within the first original conveying path a, the second original conveying path (discharging path) b, the third original conveying path (inversion path) c and the fourth original conveying path (inversion discharging path) d, respectively.

The original $O_5$ is in a state as in the one-side reading mode, i.e., in a state in which the first surface is exposed and unread.

The original $O_6$ is within the discharging path b and in the course of traveling toward the first original reading unit 31 after passing through the inversion path c and is inverted. Therefore, the first surface of the original $O_6$ is exposed. Although the first surface of the original $O_6$ has been read, the second surface of the original $O_6$ is not read yet. Therefore, the both-surface reading mode is unaccomplished.

The original $O_7$ is in a state before inversion, and therefore the second surface of the original $O_7$ is exposed. Hence, as in the case of the original $O_6$, the both-surface reading mode is unaccomplished.

The surface of the original $O_8$ has been inverted twice and the second surface of the orginal $O_8$ is exposed. Since both surfaces of the original $O_8$ have been read, the both-surface reading mode is accomplished.

The perspective view of FIG. 6 illustrates the states of display means 24c, 24d, 24e and 24f corresponding to the above-described conditions. As in the first embodiment, each of the display means displays information relating the first surface or the second surface, and the state of the reading operation (processing-state information). In addition, the order of the concerned original is displayed as information necessary for the case of the present embodiment in which the paths have complicated shapes and at least two originals remain. Thus, it is possible to smoothly remove remaining originals without changing the order of the pages of the originals even if the order has changed in jam removing processing. In FIG. 6, display 24c indicates "first surface", "unread" and "No. 4", display 24d indicates "first surface", "unread" and "No. 2", display 24e indicates "second surface", "unread" and "No. 3", and display 24f indicates "second surface", "read" and "No. 1". No. 1 indicates that the concerned original is the youngest of originals present in the path.

As shown in the first and second embodiments, if the states of originals remaining in a specific path are constant, each of the above-described display means 24a–24f may be made of a label, or a marking or the like formed on the surface of the guide. It is, of course, desirable to provide these display means outside the maximum sheet passage region because it is desirable to see the display means in the vicinity of original-path guides when remaining originals are present (see FIG. 6).

Third Embodiment

As described above, when the states of originals present in a specific path are always constant, the display means also performs constant display. When the first and second embodiments are combined, an original remaining in the discharging path b has its second surface exposed and read in the one-side reading mode, but has its first surface exposed and unread in the both-side reading mode. When the number of remaining originals differs depending on the sheet size or the like, display of the order of conveyance of originals, of course, differs.

That is, it is necessary to change the contents of display for respective modes. Hence, as shown in FIGS. 7 and 8, the contents of display of display means may be switched using driving means.

Figure 7:
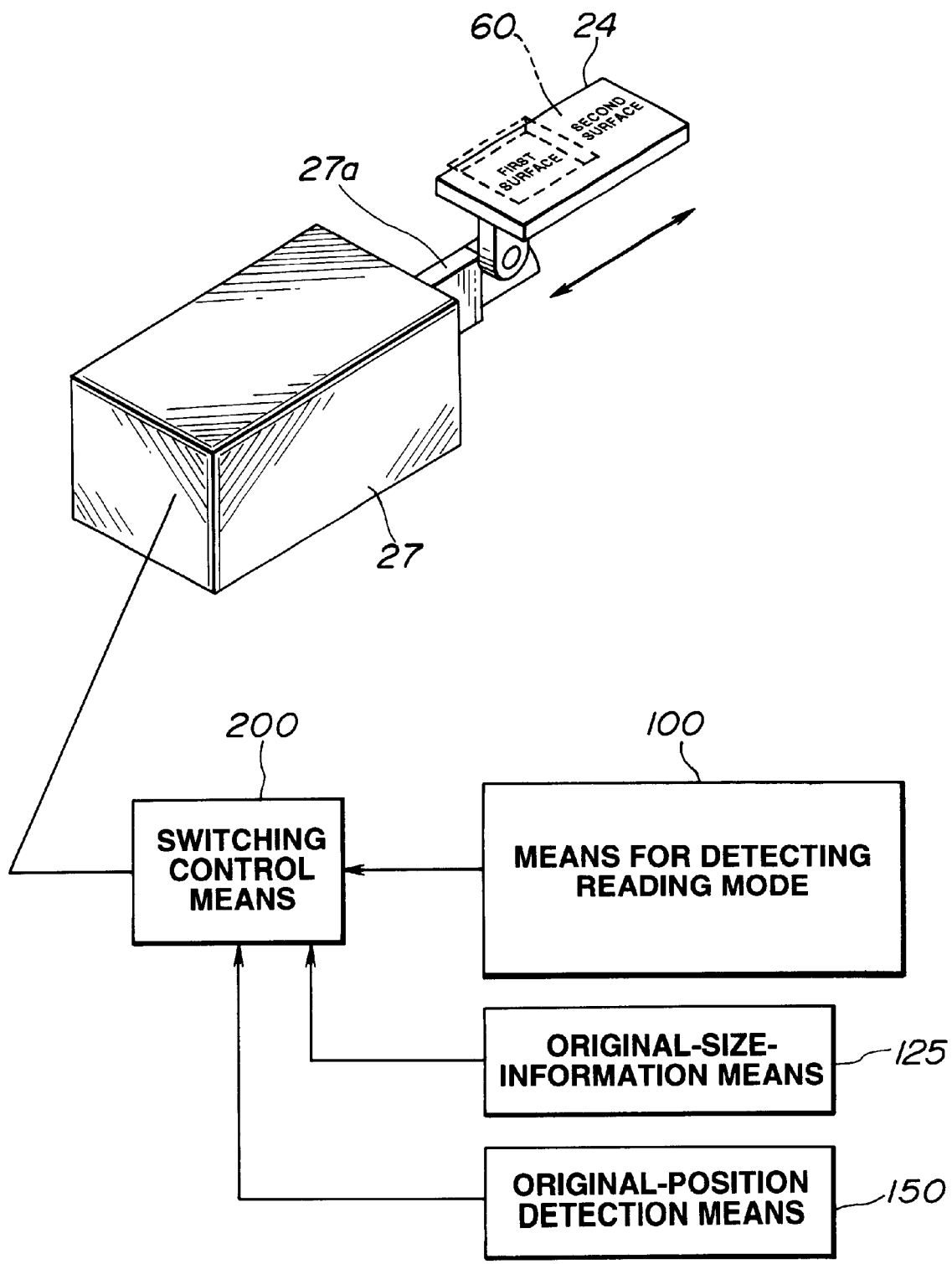
FIG. 7 is a perspective view illustrating a display-means switching mechanism of an automatic original feeding device according to a third embodiment of the present invention.

In FIG. 7, display means 24 is slid via a connecting member using a solenoid 27, serving as driving means, in order to display a necessary portion through a display window 60 (indicated by dotted lines) formed in a guide plate.

Figure 8:
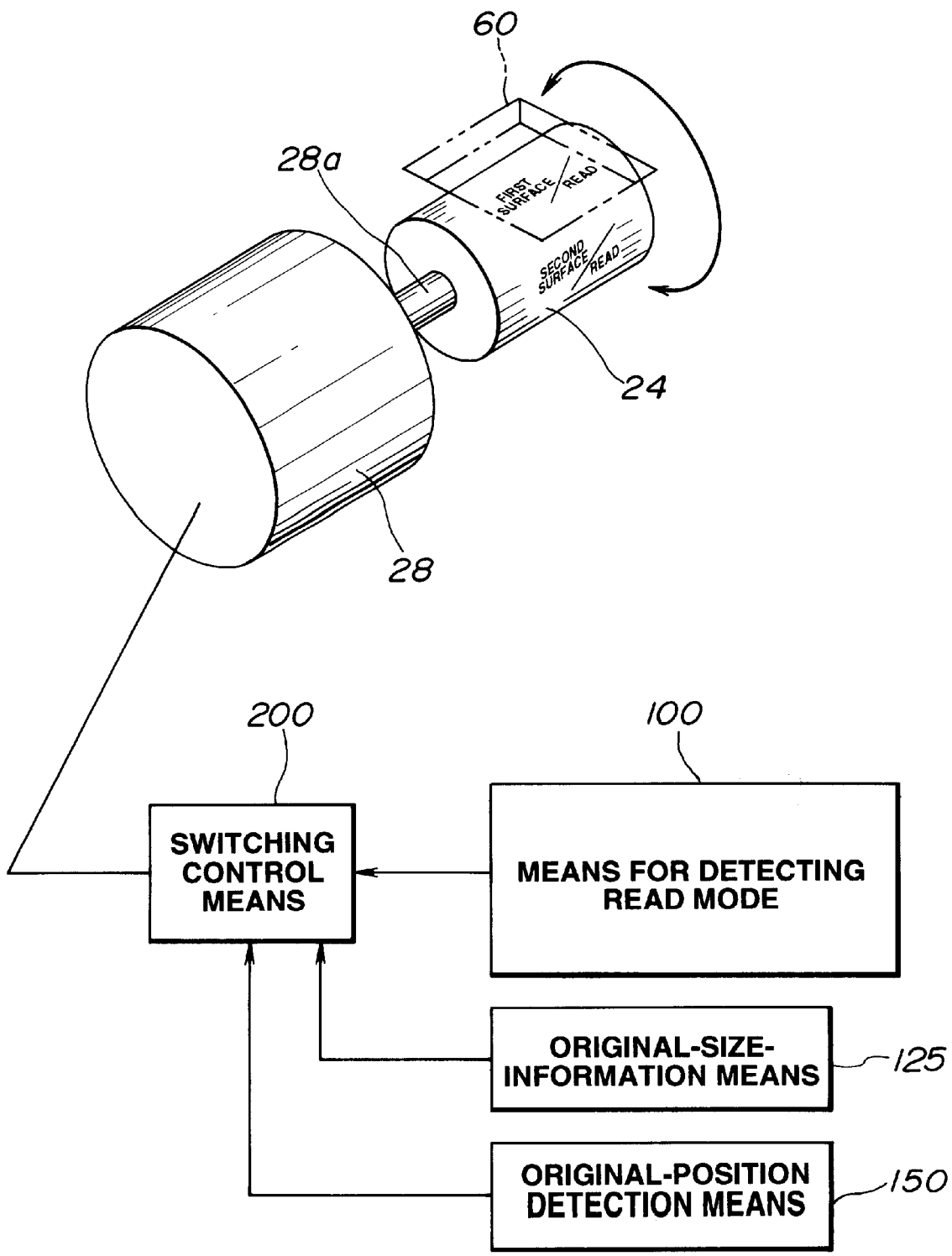
FIG. 8 is a perspective view illustrating another example of the display-means switching mechanism.

In FIG. 8, a necessary portion is switched using display 24 on a rotating drum fixed on an output shaft 28a of a motor 28.

Switching for various situations can be performed by combining means 100, 125 and 150 (for example, sensors in the path) for detecting the reading mode 100, the original size 125, the position of the original 150, respectively, and means 200 for controlling the driving means. Particularly in the vicinity of the first original reading unit 31, since switching between read/unread is necessary depending on the stop position of the original, it is also desirable to provide original-position detection means. This is because the stop position differs depending on the size of the original.

Switching may be performed in accordance with only the size of the original, or only the one-side reading mode/the both-side reading mode.

When using a small LCD (liquid-crystal display) panel, LED's (light-emitting diodes) or the like as the display means 24, it is necessary to provide driving means for directly controlling the contents of display.

Fourth Embodiment

Figure 9:
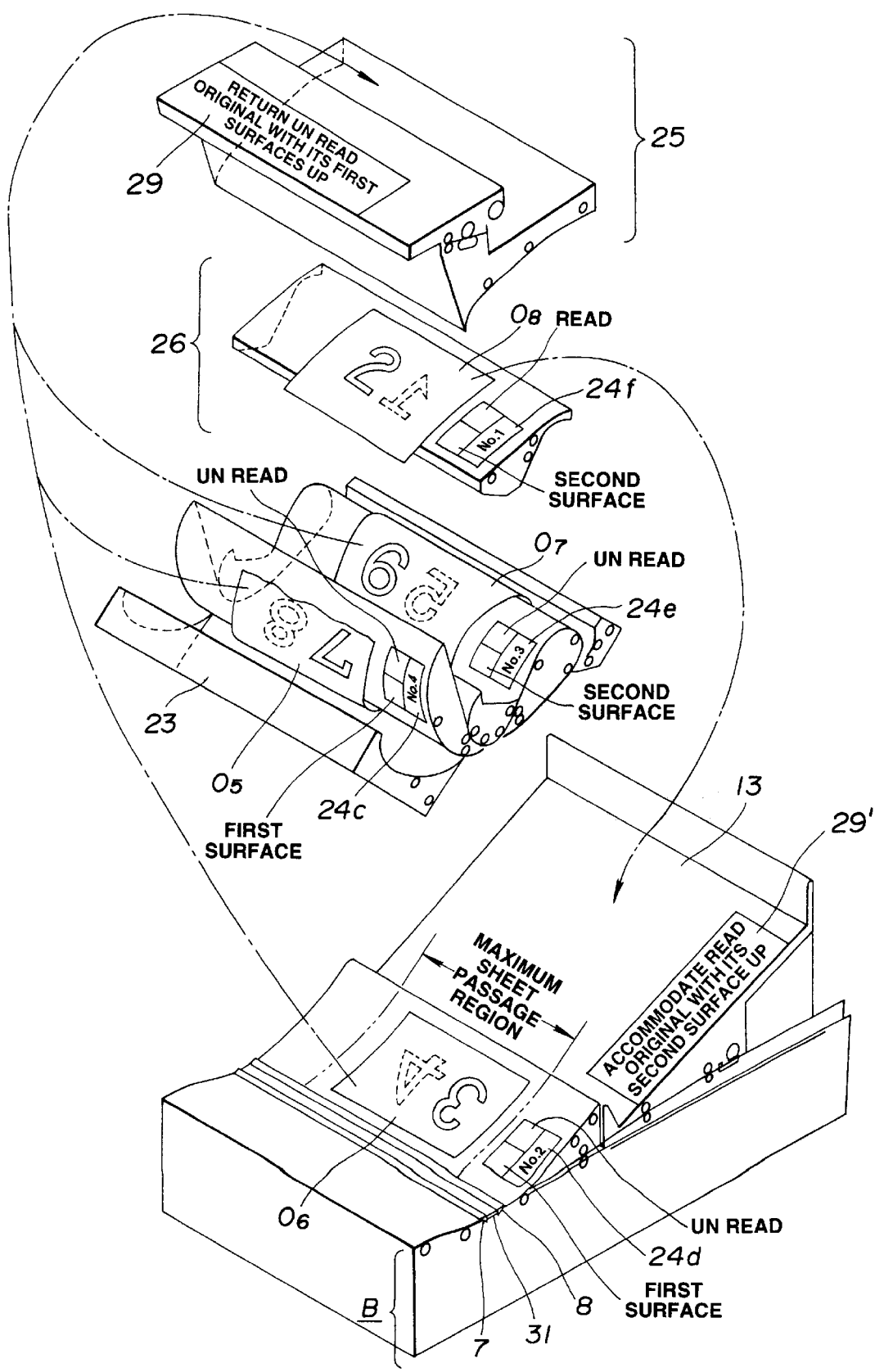
FIG. 9 is a perspective view illustrating states in which remaining originals are dealt with in an automatic original feeding device according to a fourth embodiment of the present invention.

A description will now be provided of a case in which information other than the states of processing of originals (the first surface/the second surface, read/unread, and the order) is also displayed, with reference to FIG. 9.

In the above-described automatic original feeding device A, the original-mounting tray 1 and the discharging tray 13 are provided at different positions. Hence, unread originals must be returned to the original-mounting tray 1 and read originals must be sent to the discharging tray 13 to be accommodated therein. By providing labels 29 and 29' indicating handling of jammed originals on predetermined positions on the sheet-feeding unit 25 and the discharging tray 13, respectively, as shown in FIG. 9, jam removing processing and recovery processing with fewer misoperations can be realized.

Information relating to handling of remaining originals may, of course, be displayed on a part of each display means 24.

Figure 10:
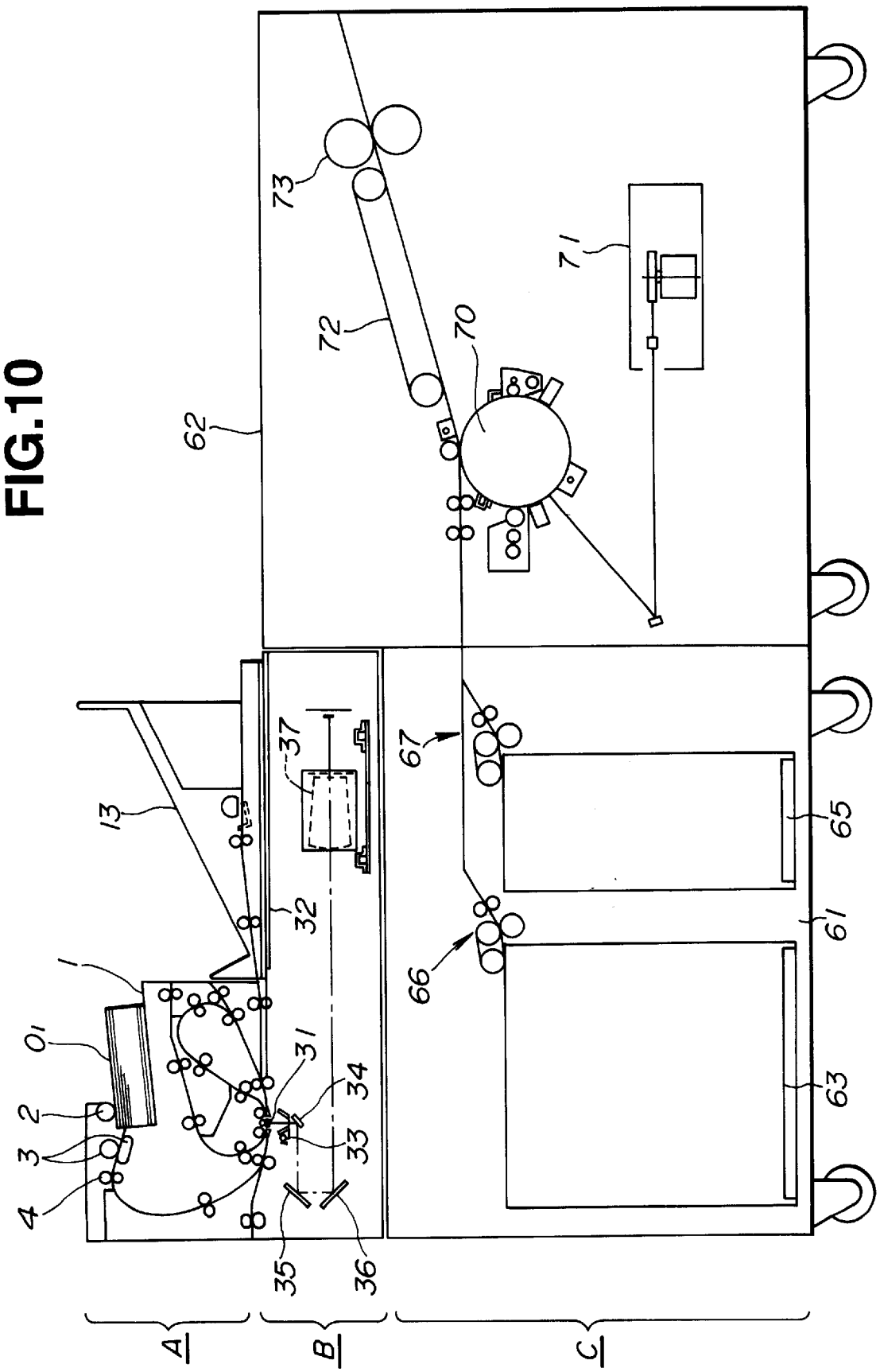
FIG. 10 is a cross-sectional side view illustrating an image forming apparatus including an automatic original reading device to which an automatic original feeding device according to the present invention is applied.

FIG. 10 illustrates a case in which the automatic original reading device B, to which the automatic original feeding device A according to the present invention is applied, is integrally mounted on an image forming apparatus C.

The image forming apparatus C comprises a sheet feeding unit 61, comprising a plurality of sheet feeding decks 63 and 65, and sheet feeding units 66 and 67 corresponding to the respective decks, and an image forming unit, comprising a photosensitive drum 70 and a laser unit 71, constituting an image forming unit, and the like. A toner image is formed on the photosensitive drum 70 in accordance with image information read by the above-described first original reading unit 31 according to a well-known electrophotographic copying method. The toner image is transferred onto a recording sheet fed from the sheet feeding unit 61 and the transferred toner image is fixed. Thereafter, the recording sheet is discharged outside the apparatus C by a conveying belt 72 and discharging rollers 73. By thus applying the automatic original reading device B including the automatic original feeding device B to the image forming apparatus C, an image forming apparatus having an improved jam removing capability can be realized.

The present invention is not limited to the above-described automatic original feeding device, but may also be applied to various kinds of devices depending on the shapes of original-conveying paths, original-processing modes or the like. The number and the arrangement of display means, and the contents of display may differ depending on respective devices.

The form and the shape of display means, and combination of detection means for detecting original-processing states, and control means for controlling switching of display means may also be changed depending on respective devices. That is, the object of the present invention is to notify the user of the states of remaining originals to be dealt with, and the shape of display means and the method of notification are not limited to specific shape and method disclosed.

The number of conveying paths is not limited to the number described in the embodiments, and all of existing conveying paths are not necessarily opened. It is not always necessary to provide display means in all of opened conveying paths.

A jammed original may be taken out of the corresponding path and mounted again together with originals remaining on the tray 1. These originals may be sequentially refed, and only new originals may be read by skipping read originals.

In another approach, a jammed original may be taken out of the corresponding path, and only unread originals may be returned onto the tray 1.

The individual components shown in block format in FIGS. 7 and 8 are well known in the automatic original feeding device arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims.

What is claimed is:

1. An automatic original feeding device comprising:
   mounting means for mounting originals;
   a first sheet conveying path for conveying an original mounted on said mounting means to a predetermined position;
   a second sheet conveying path for guiding the original output from the predetermined position to a discharging position from which the original is to be discharged, said automatic original feeding device being openable to expose said first and second sheet conveying paths; and a plurality of display means, each provided in the vicinity of a corresponding one of said first and second sheet conveying paths, for displaying information in order of pages about originals remaining respectively in each of said first and second sheet conveying paths.

2. An automatic original feeding device according to claim 1, further comprising:

switching means for switching in order of pages the information of said display means; and control means for controlling said switching means in accordance with a state of the remaining originals.

3. An automatic original feeding device according to claim 1, wherein each of said display means is provided outside a sheet conveying region within the corresponding one of said first and second sheet conveying paths.

4. An automatic original feeding device according to claim 2, wherein each of said display means is provided outside a sheet conveying region within the corresponding one of said first and second sheet conveying paths.

5. An automatic original feeding device according to claim 1, further comprising:

discharging means for discharging originals from the discharging position; and a discharging tray for receiving the discharged originals.

6. An automatic original reading device comprising:

mounting means for mounting originals;

a first sheet conveying path for conveying an original mounted on said mounting means to a predetermined position;

a second sheet conveying path for guiding the original from the predetermined position to a discharging position from which the original is to be discharged, said automatic original reading device being openable to expose said first and second sheet conveying paths;

a plurality of display means, each provided in the vicinity of a corresponding one of said first and second sheet conveying paths, for displaying information on whether originals have been read, the originals remaining respectively in each of said first and second conveying paths; and reading means for reading a fed original at the predetermined position.

7. An automatic original reading device according to claim 6, further comprising:

switching means for switching the information of said display means as to whether originals have been read; and control means for controlling said switching means in accordance with a state of the remaining originals.

8. An automatic original reading device according to claim 6, wherein each of said display means is provided outside a sheet conveying region within the corresponding one of said first and second sheet conveying paths.

9. An automatic original reading device according to claim 7, wherein each of said display means is provided outside a sheet conveying region within the corresponding one of said first and second sheet conveying paths.

10. An image forming apparatus comprising:

mounting means for mounting originals;

a first sheet conveying path for conveying an original mounted on said mounting means to a predetermined reading position;

a second sheet conveying path for guiding the original from the predetermined reading position to a discharging position from which the original is to be discharged, said image forming apparatus being openable to expose said first and second sheet conveying paths;

a plurality of display means, each provided in the vicinity of a corresponding one of said first and second sheet conveying paths, for displaying information on whether originals have been read, the originals remaining respectively in each of said first and second conveying paths;

reading means for reading a fed original at the predetermined reading position; and an image forming unit for forming an image on a recording medium corresponding to the image of the read original.

11. An image forming apparatus according to claim 10, further comprising:

switching means for switching the information of said display means as to whether originals have been read; and control means for controlling said switching means in accordance with a state of the remaining originals.

12. An image forming apparatus according to claim 10, wherein each of said display means is provided outside a sheet conveying region within the corresponding one of said first and second sheet conveying paths.

13. An image forming apparatus according to claim 11, wherein each of said display means is provided outside a sheet conveying region within the corresponding one of said first and second sheet conveying paths.

14. An automatic original feeding device comprising:

mounting means for mounting originals;

a first sheet conveying path for conveying an original mounted on said mounting means to a predetermined position;

an inverting conveying path for guiding the original from the predetermined position along a path back to the predetermined position while inverting surfaces of the original;

a second sheet conveying path for guiding the original from the predetermined position to a discharging position from which the original is to be discharged, said automatic original feeding device being openable to expose said first and second sheet conveying paths and said inverting conveying path;

a plurality of display means, each provided in the vicinity of a corresponding one of said conveying paths, and each for displaying information on whether the surface of originals is the first or the second, the originals remaining respectively in the corresponding one of said conveying path.

15. An automatic original feeding device according to claim 14, further comprising:

switching means for switching the information of said display means as to whether the surface of originals is the first or the second; and control means for controlling said switching means in accordance with a state of the remaining originals.

16. An automatic original feeding device according to claim 14, wherein each of said display means is provided outside a sheet conveying region within the corresponding one of said sheet conveying paths.

17. An automatic original feeding device according to claim 15, wherein each of said display means is provided outside a sheet conveying region within the corresponding one of said sheet conveying paths.

18. An automatic original feeding device according to claim 14, further comprising a discharging tray for receiving discharged originals and discharging means for discharging the original from the discharging position into said discharging tray.

19. An automatic original reading device comprising:
   mounting means for mounting originals;
   a first sheet conveying path for conveying an original mounted on said mounting means to a predetermined position;
   an inverting conveying path for guiding the original from the predetermined position along a path back to the predetermined position while inverting surfaces of the original;
   a second sheet conveying path for guiding the original from the predetermined position to a discharging position from which the original is to be discharged, said automatic original reading device being openable to expose said first and second sheet conveying paths and said inverting conveying path;
   a plurality of display means, each provided in the vicinity of a corresponding one of said conveying paths, and each for displaying information on one of whether the surface of originals is the first or the second and whether originals have been read, the originals remaining respectively in the corresponding one of said conveying path; and
   reading means for reading a fed original at the predetermined position.

20. An automatic original reading device according to claim 19, further comprising:
   switching means for switching the information of said display means as to one of whether the surface of originals is the first or the second and whether originals have been read; and
   control means for controlling said switching means in accordance with a state of the remaining originals.

21. An automatic original reading device according to claim 19, wherein each of said display means is provided outside a sheet conveying region within the corresponding one of said first and second sheet conveying paths.

22. An automatic original reading device according to claim 20, wherein each of said display means is provided outside a sheet conveying region within the corresponding one of said first and second sheet conveying paths.

23. An image forming apparatus comprising:
   mounting means for mounting originals;
   a first sheet conveying path for conveying an original mounted on said mounting means to a predetermined reading position;
   an inverting conveying path for guiding the original from the predetermined position along a path back to the predetermined reading position while inverting surfaces of the original;
   a second sheet conveying path for guiding the original from the predetermined reading position to a discharging position from which the original is to be discharged, said image forming apparatus being openable to expose said first and second sheet conveying paths and said inverting conveying path;
   a plurality of display means, each provided in the vicinity of a corresponding one of said conveying paths, and each for displaying information on one of whether the surface of originals is the first or the second and whether originals have been read, the originals remaining respectively in the corresponding one of said conveying paths;
   reading means for reading a fed original at the predetermined reading position; and
   an image forming unit for forming an image on a recording medium corresponding to the image of the original.

24. An image forming apparatus according to claim 23, further comprising:
   switching means for switching the information of said display means as to one of whether the surface of originals is the first or the second and whether originals have been read; and
   control means for controlling said switching means in accordance with a state of the remaining originals.

25. An image forming apparatus according to claim 23, wherein each of said display means is provided outside a sheet conveying region within the corresponding one of said first and second sheet conveying paths.

26. An image forming apparatus according to claim 24, wherein each of said display means is provided outside a sheet conveying region within the corresponding one of said first and second sheet conveying paths.

27. An automatic original feeding device including a plurality of conveying paths for guiding an original to a predetermined position and for guiding the original from the predetermined position to a discharging position from which the original is discharged, the automatic original feeding device being openable to expose at least one of the plurality of conveying paths, said automatic original feeding device comprising:
   a plurality of display means, each provided in a vicinity of a corresponding one of said at least on exposed conveying path, for displaying information in order of pages about originals remaining within the exposed conveying path.

28. An automatic original feeding device according to claim 27, further comprising:
   switching means for switching the information in order of pages of said display means; and
   control means for controlling said switching means in accordance with a state of the remaining originals.

29. An automatic original feeding device according to claim 27, wherein each of said display means for displaying the information about the remaining originals is provided outside a sheet conveying region within the corresponding one of opened sheet conveying paths.

30. An automatic original feeding device according to claim 28, wherein each of said display means for displaying the information about the remaining originals is provided outside a sheet conveying region within the corresponding one of opened sheet conveying paths.

31. An automatic original feeding device according to claim 27, further comprising a discharging tray for receiving discharged originals and discharging means for discharging the originals to said tray.

32. An automatic original reading device including a plurality of conveying paths for guiding an original to a predetermined reading position where it is read and for guiding the original from the predetermined reading position to a discharging position from which the original is discharged, the original reading device being openable to expose at least one of the plurality of conveying paths, said automatic original reading device comprising:
   a plurality of display means, each provided in a vicinity of a corresponding one of said at least one exposed conveying path, for displaying information on whether originals have been read, the originals remaining within the exposed conveying path; and reading means for reading the original at the predetermined reading position.

33. An automatic original reading device according to claim 32, further comprising:

switching means for switching the information of said display means as to whether originals have been read; and control means for controlling said switching means in accordance with a state of the remaining originals.

34. An automatic original reading device according to claim 32, wherein each of said display means is provided outside a sheet conveying region within the corresponding one of said first and second sheet conveying paths.

35. An automatic original reading device according to claim 33, wherein each of said display means is provided outside a sheet conveying region within the corresponding one of said first and second sheet conveying paths.

36. An image forming apparatus including a plurality of conveying paths for guiding an original to a predetermined reading position where it is read and for guiding the original from the predetermined reading position to a discharging position from which the original is discharged, the image forming apparatus being openable to expose at least one of the plurality of conveying paths, said image forming apparatus comprising:

a plurality of display means, each provided in a vicinity of a corresponding one of said at least one exposed conveying path, for displaying information on whether originals have been read, the originals remaining within the at least one exposed conveying path;

reading means for reading a fed original at the predetermined reading position; and an image forming unit for forming an image on a recording medium corresponding to the read image of the original.

37. An image forming apparatus according to claim 36, further comprising:

switching means for switching the information of said display means as to whether originals have been read; and control means for controlling said switching means in accordance with a state of the remaining originals.

38. An image forming apparatus according to claim 36, wherein each of said display means is provided outside a sheet conveying region within the corresponding one of said first and second sheet conveying paths.

39. An image forming apparatus according to claim 37, wherein each of said display means is provided outside a sheet conveying region within the corresponding one of said first and second sheet conveying paths.

40. An automatic original feeding device comprising:

a plurality of conveying paths for conveying an original to a predetermined position, for guiding the original from the predetermined position along a path back to the predetermined position while inverting surfaces of the original, and for guiding the original from the predetermined position to a discharging position from which the original is to be discharged, said automatic original feeding device being openable to expose at least one of the plurality of conveying paths; and a plurality of display means, each provided in the vicinity of a corresponding one of said at least one exposed conveying path, for displaying information relating to whether the surface of originals is the first or the second, the originals remaining within the exposed conveying path.

41. An automatic original reading device comprising:

a plurality of conveying paths for conveying an original to a predetermined position, for guiding the original from the predetermined position along a path back to the predetermined position while inverting surfaces of the original, and for guiding the original from the predetermined position to a discharging position from which the original is to be discharged, said automatic original reading device being openable to expose at least one of the plurality of conveying paths;

a plurality of display means, each provided in the vicinity of a corresponding one of said at least one exposed conveying path, for displaying information on whether the surface of originals is the first or the second or whether the original has been read, the originals remaining within the exposed conveying path; and reading means for reading a fed original at the predetermined portion.

42. An image forming apparatus comprising:

mounting means for mounting originals;

a plurality of conveying paths for conveying an original to a predetermined reading position, for guiding the original from the predetermined reading position along a path back to the predetermined reading position while inverting surfaces of the original, and for guiding the original from the predetermined reading position to a discharging position from which the original is to be discharged, said image forming apparatus being openable to expose at least one of the plurality of conveying paths;

a plurality of display means, each provided in the vicinity of a corresponding one of said at least one exposed conveying paths, for displaying information on whether the surface of originals is the first or the second or whether the original has been read, the originals remaining within the exposed conveying path;

reading means for reading a fed original at the predetermined reading position; and an image forming unit for forming an image on a recording medium corresponding to the image of the original.

43. An automatic original reading device according to claim 6, 19, 32 or 41, wherein the information displayed is of the order of pages.

44. An image forming apparatus according to either claim 10, 36 or 42, wherein the information displayed is of the order of pages.

45. An automatic original feeding device according to claim 14 or 40, wherein the information displayed is of the order of pages.

46. An automatic original feeding device comprising:

mounting means for mounting originals;

a first sheet conveying path for conveying an original mounted on said mounting means to a predetermined position;

a second sheet conveying path for guiding the original output from the predetermined position to a discharging position from which the original is to be discharged, said automatic original feeding device being openable to expose said first and second sheet conveying paths; and a plurality of display means, each provided in the vicinity of a corresponding one of said first and second sheet conveying paths, for displaying information enabling collection of originals remaining respectively in each of said first and second sheet conveying paths and restoring originals to the order mounted on the mounting means.

47. An automatic original feeding device including a plurality of conveying paths for guiding an original to a predetermined position and for guiding the original from the predetermined position to a discharging position from which the original is discharged, the automatic original feeding device being openable to expose at least one of the plurality of conveying paths, said automatic original feeding device comprising:

a plurality of display means, each provided in a vicinity of a corresponding one of said at least one exposed conveying path, for displaying information enabling collection of originals remaining within the exposed conveying path and restoring originals to the order mounted on the mounting means.

48. An automatic original reading device including a plurality of conveying paths for guiding an original to a predetermined reading position where it is read and for guiding the original from the predetermined reading position to a discharging position from which the original is discharged, the original reading device being openable to expose at least one of the plurality of conveying paths, said automatic original reading device comprising:

a plurality of display means, each provided in a vicinity of a corresponding one of said at least one exposed conveying path, for displaying information enabling collection of originals remaining within the exposed conveying path and restoring originals order mounted on the mounting means; and reading means for reading the original at the predetermined reading position.

49. An automatic original feeding device comprising:

a plurality of conveying paths for conveying an original to a predetermined position, for guiding the original from the predetermined position along a path back to the predetermined position while inverting surfaces of the original, and for guiding the original from the predetermined position to a discharging position from which the original is to be discharged, said automatic original feeding device being openable to expose at least one of the plurality of conveying paths; and a plurality of display means, each provided in the vicinity of a corresponding one of said at least one exposed conveying paths, for displaying information enabling collection of originals remaining within the exposed conveying path and restoring originals to the order mounted on the mounting means.

50. An automatic original reading device comprising:

a plurality of conveying paths for conveying an original to a predetermined position, for guiding the original from the predetermined position along a path back to the predetermined position while inverting surfaces of the original, and for guiding the original from the predetermined position to a discharging position from which the original is to be discharged, said automatic original reading device being openable to expose at least one of the plurality of conveying paths;

a plurality of display means, each provided in the vicinity of a corresponding one of said at least one exposed conveying paths, for displaying information enabling collection of originals remaining within the exposed conveying path and restoring originals to the order mounted on the mounting means; and reading means for reading a fed original at the predetermined position.

* * * * *

UNITED STATES PATENT AND TRADEMARK OFFICE
CERTIFICATE OF CORRECTION

PATENT NO. : 5,915,159
DATED : June 22, 1999
INVENTOR(S) : TAMOTSU OKADA

It is certified that error appears in the above-identified patent and that said Letters Patent is hereby corrected as shown below:

COLUMN 1,
Line 45, "original" should read -originals-; and
Line 49, "mininized" should read -minimized-.

COLUMN 2,
Line 1, "of" should read -of the-.

COLUMN 4,
Line 35, "desribed" should read -described-.

COLUMN 7,
Line 24, "intents" should read -intends--.

COLUMN 9,
Line 66, "corresonding" should read -corresponding-.

COLUMN 14,
Line 30, "on" should read -one-.

UNITED STATES PATENT AND TRADEMARK OFFICE
CERTIFICATE OF CORRECTION

PATENT NO.    : 5,915,159

DATED         : June 22, 1999

INVENTOR(S) : TAMOTSU OKADA

It is certified that error appears in the above-identified patent and that said Letters Patent is hereby corrected as shown below:

COLUMN 17
Line 27, "originals order" should read -originals to the order-.

Signed and Sealed this

Fourth Day of January, 2000

Attest:

Attesting Officer

Acting Commissioner of Patents and Trademarks